Oct. 22, 1963  M. L. SCHWARZ  3,107,691
COUPLING VALVE FOR BLEEDING APPARATUS
Filed March 23, 1961

INVENTOR.
MAURICE L. SCHWARZ
BY
ATTORNEYS

United States Patent Office 3,107,691
Patented Oct. 22, 1963

3,107,691
COUPLING VALVE FOR BLEEDING APPARATUS
Maurice L. Schwarz, Middletown, Conn., assignor to The Eis Automotive Corporation, Middletown, Conn., a corporation of Connecticut
Filed Mar. 23, 1961, Ser. No. 97,933
15 Claims. (Cl. 137—614.19)

This invention relates to valves, and deals more particularly with a valve assembly for coupling a source of pressure fluid to an hydraulic system for the purpose of bleeding the system.

The coupling valve assembly of the present invention finds particular utility in the bleeding of hydraulic brake systems such as employed in automobiles, trucks and other vehicles, and will be described in connection with such use. It is to be understood, however, that the invention is not necessarily so limited and that the valve covered by the invention may be used as well for the bleeding of other hydraulic systems if desired.

The general object of this invention is to provide a valve assembly for coupling a source of bleeding fluid to an hydraulic system and which valve assembly is selectively operable to permit or prevent the flow of bleeding fluid to the system. In keeping with this object it is a more specific object to provide in the aforesaid valve assembly a valve element which is normally seated to prevent the flow of bleeding fluid through the valve and which may be displaced from its seat and held in such displaced position by a simple manipulation of the valve assembly to permit the flow of bleeding fluid therethrough.

Another object of this invention is to provide a coupling valve assembly which may be permanently attached to the end of a bleeding fluid supply line or hose and yet be attached to and removed from threaded connection with parts of hydraulic systems without twisting said delivery line or hose. In keeping with this object of the invention it is a more particular object to provide a valve assembly having two relatively rotatable parts with one part having means adapted for connection with a bleeding fluid supply line and with the other part having means adapted for threaded connection with a part of an hydraulic system.

Another object of this invention is to provide a coupling valve assembly of simple construction for use with an hydraulic system bleeding apparatus, the valve assembly including a first manually displaceable check valve element for selectively permitting or preventing the flow of bleeding fluid from the source thereof, and also including a second check valve element for preventing the flow of fluid in the reverse direction through the valve.

Another object of this invention is to provide a coupling valve assembly having a simple means for releasably holding the valve in an open condition and whereby the valve may be quickly and easily opened or closed by the operator.

Other objects and advantages will be apparent during the course of the following description and from the drawing forming a part hereof.

The drawing shows the preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
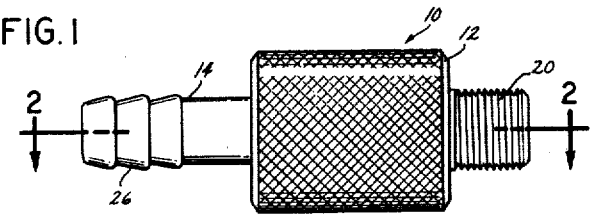
FIG. 1 is an elevational view of a coupling valve embodying this invention.
Figure 2:
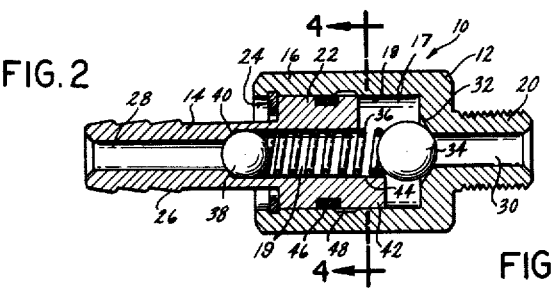
FIG. 2 is a longitudinal sectional view taken on the line 2—2 of FIG. 1 and showing the parts of the valve in closed position.
Figures 3, 4:
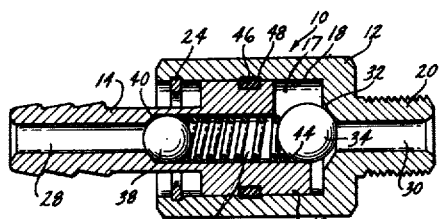
FIG. 3 is a view similar to FIG. 2 but showing the parts of the valve in open position.
FIG. 4 is a transverse sectional view taken on the line 4—4 of FIG. 2.

Referring to the drawings, FIGS. 1 to 4, inclusive, show a coupling valve assembly 10 comprising one embodiment of the present invention. The valve assembly 10 includes a female body member 12 and a male body member 14. The female body member 12 is generally symmetrical about its longitudinal axis and has a rearward or left-hand portion 16, as viewed in FIGS. 1, 2 and 3, provided with a longitudinally extending cylindrical bore 18. At its forward or right-hand end, the same member is provided with means adapted for connection to a brake or other hydraulic system which is to be bled by high pressure fluid introduced through the valve assembly. In the present instance this connection means is shown to comprise a forward end portion 20 provided with external threads for threaded connection with the hydraulic system. It is to be understood, however, that other connection means, such as a barbed stem for connection with a tube or hose, could also be employed without departing from the invention.

Slidably received in the bore 18 of the female member 12 is a cylindrical part or forward portion 22 of the male member 14. The cylindrical part 22 fits relatively closely with the bore 18, and by reason of the cylindrical shape of both the part 22 and the bore 18 the male member 14 may be rotated as well as be moved longitudinally with respect to the female member. The part 22 is retained in the bore 18 and limited in its rearward movement with respect thereto by suitable stop means such as a snap ring 24 received by an annular groove formed in the surface of the bore 18 near the rearward end thereof. Rearwardly of the cylindrical part 22 the male member 14 includes a means adapted for connection with a bleeding fluid supply line or hose. In the illustrated case this means comprises a longitudinally extending barbed stem 26 adapted for insertion into the bore of a flexible supply hose or the like. It will of course be understood that other connection means may be provided depending on the nature of the supply line with which the valve assembly is to be used. It is intended that the valve assembly 10 may be permanently or semi-permanently attached to the bleeding fluid supply line and it is the purpose of the valve assembly, as hereinafter described, to prevent the flow of bleeding fluid from the supply line when the assembly is disconnected from an hydraulic system and to permit such flow when the valve assembly is connected with an hydraulic system.

To achieve this, the male member is provided with a longitudinal passageway 28 and the forward portion 20 of the female member is provided with a passageway 30. Each of these passageways communicates with a valve chamber 17 defined by the internal bore 18 of the female member and a counterbore 19 in the right-hand portion of the male member. The counterbore 19 is of larger diameter than the passageway 28 and communicates with the latter so that a path is provided for the flow of fluid through the valve assembly. The female member is also provided with a rearwardly facing conical seat 32 which surrounds the passageway 30 and is located between said passageway and the bore 18 as shown in FIGS. 2 and 3. Cooperating with the seat 32 is a first valve element in the form of a ball check 34 disposed in the bore adjacent the seat. A spring 36 is associated with the ball check and acts to bias the same forwardly toward a closed position on the seat 32. The spring 36 is or may be a helical compression spring which is received in part by said enlarged diameter counterbore 19 in the male member. At its rearward or left-hand end the spring 36 engages another ball check 38 which normally seats against a forwardly facing conical seat 40 surrounding the passageway 28 and located between the passageway 28 and the counterbore 19. The enlarged diameter counterbore 19 located forwardly of the valve seat serves to provide lateral support for the part of the spring 36 received thereby.

It will thus be observed that spring 36 is compressed between the ball checks 34 and 38 and functions to normally hold these elements on their respective seats 32 and 40, which two seats are oppositely directed and face each other in the valve chamber. It will also be observed that the spring 36 further acts as a means for biasing the male member rearwardly with respect to the female member and for normally holding the male member in engagement with the snap ring 24. For convenience the longitudinal position of the male member with respect to the female member when the male member engages the snap ring 24 will be referred to as the first position of the male member relative to the female member. This position is illustrated by FIG. 2 of the drawings.

From FIG. 2 it will be noted that when the male member 14 is in its said first position the ball check 34 in cooperation with its seat 32 acts as a check valve means to prevent the flow of high pressure bleeding fluid in a forward direction through the valve assembly from a supply line connected with the stem 26. Likewise the ball check 38 in cooperation with its seat 40 acts as a check valve means for preventing the flow of fluid in a reverse direction through the valve from the hydraulic system to which the valve assembly is connected. In this regard it should be noted that the check valve means provided by the ball check 38 and the seat 40 for preventing reverse flow through the valve assembly is not entirely essential to the broader aspects of this invention and may be omitted if desired. If this omission is made it will be understood that the spring 36 should be so designed that its rearward or left-hand end will directly engage or work against the male member so as to bias the male member and the ball check 34 in opposite directions.

For the purpose of opening the ball check 34 to permit the forward flow of pressure fluid through the valve assembly, the said assembly also includes means for displacing the ball check 34 from its seat in response to longitudinal movement of the male member relative to the female member. In the illustrated example this means includes a forwardly extending cam portion 42 on the forward end of the male member 14. This cam portion is out of engagement with the ball check 34 when the male member is in its first or rearward position relative to the female member, but is engageable with the ball check to displace the same laterally from the seat 32 when the male member is moved longitudinally forwardly from its first position to a second position relative to the female member. As shown in FIG. 4 the cam portion 42 has a generally segmental shape in transverse cross section and has a flat cam surface 44 arranged parallel to the longitudinal axis of the valve assembly. The cam surface 44 is spaced from the longitudinal axis or center line of the valve assembly by a distance less than the radius of the ball check 34.

When the male member is in the first position, as shown in FIG. 2, the forward end of the cam member 42 is spaced slightly rearwardly from engagement with the ball check 34. However, when the male member is moved forwardly to a second position, as shown in FIG. 3, the cam portion engages the ball check and the latter rides up on the cam surface 44 so as to be displaced laterally from its seat 32 thereby opening the valve assembly for forward fluid flow. When the male member is returned to its rearward or first position, the cam portion 44 disengages the ball check 44 and permits the same to return to its closed position on the seat 32. After the valve assembly is connected with an hydraulic system the male member is readily and easily moved between its first and second positions to open and close the valve for the flow of pressure fluid therethrough by grasping the stem 26, or the line attached thereto, and sliding the same in one direction or the other relative to the female member. That is, to open the valve assembly the stem 26 is merely pushed into the female member, while to close the same the stem is pulled out of the female member as far as it will go.

The valve assembly 10 also preferably includes means for releasably holding the male member in its second position whereat the valve assembly is open for the forward flow of pressure fluid therethrough. In the embodiment of FIGS. 1 to 4, inclusive, this means includes an O-ring seal 46 carried by the cylindrical part 22 of the male member 14 and located within a suitable circumferential groove formed in the latter part. The seal 46 is adapted to engage the surface of the bore 18 to provide a sliding and rotative fluid seal between the male and female members. The female member is in turn provided with a shallow annular or circumferential groove 48 formed in the bore 18. This groove is so located as to be longitudinally aligned with the O-ring seal when the male member is in its second or forward position relative to the female member with the result that the groove receives a part of the seal and acts as a detent for resisting longitudinal movement of the male member. This cooperation between the seal 46 and the groove 48 is best illustrated in FIG. 3 which shows the male member in its second position. From this figure it will be apparent that the cooperation between the groove 48 and seal 46 tends to releasably hold the male member in the illustrated position. The detent action however is such that the male member may be moved from such position by a manual pull applied to the stem 26. It is also contemplated that in cases where the valve assembly 10 is used in association with relatively low pressure bleeding systems, that the friction between the O-ring seal and the surface of the bore 18 may alone be relied upon to hold the male member in the second position and that in such instances the groove 48 may be omitted.

It should also be observed in connection with the valve assembly 10 that the female member 12 is relatively freely rotatable with respect to the male member 14. Thus in cases where the valve assembly is adapted as shown for threaded connection with an hydraulic system the female member may be rotated independently of the male member to effect such connection. Accordingly if the male member is connected to a supply line or hose the threaded connection may be made without twisting the supply line or hose or without removing the valve assembly therefrom. Also, as shown in FIG. 1, the outer surface of the female member is preferably knurled to facilitate its rotation by a user while making connection with an hydraulic system.

FIGS. 5 through 8, inclusive, show a valve assembly 50 comprising another embodiment of this invention. The valve assembly 50 is substantially identical with the valve assembly 10 except for the means employed for releasably holding the male member in its second or open position. Parts of the valve assembly 50 which are substantially identical with those of the valve assembly 10 have been given identical reference numerals and will not be redescribed.

The cylindrical part 22 of the male member 14 of the valve assembly 50 includes an O ring seal 46 for providing a fluid seal between the male and female members. In the valve assembly 50, however, the annular groove 48 is omitted. In place thereof the male and female members are provided with cooperating means providing a bayonet-type lock whereby the male member may be moved longitudinally from its first position to its second position and thereafter locked in said second position by rotating said male member relative to said female member. As illustrated, this bayonet lock means includes two radial pins 52, 52 which are secured to the female member 12 near the rear end thereof and which extend radially inwardly beyond the surface of the bore 18, as shown. The pins 52, 52 are preferably located diametrically opposite from each other, and as shown best in FIGS. 7 and 8 the male member 14 includes an axially extending portion 54 located between the cylindrical part 22 and the stem 26 which portion is provided with two diametrically opposed flats 56, 56. Between the flats 56, 56 the portion 54, 54 is cylindrical and of the same diameter as the part 22.

Figure 5:
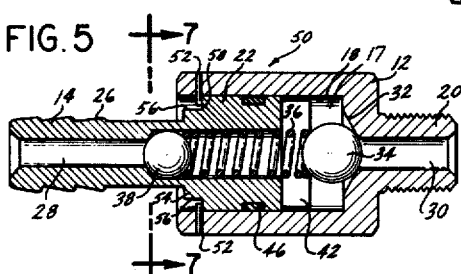
FIG. 5 is a longitudinal sectional view of a coupling valve comprising an alternative embodiment of the invention and in which view the parts of the valve are shown in closed position.
Figure 6:
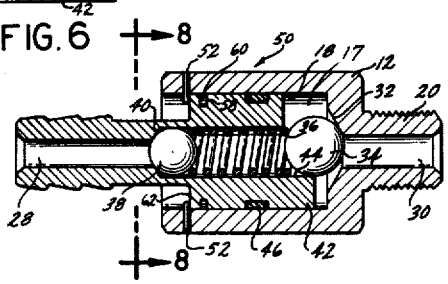
FIG. 6 is a view similar to FIG. 5 but showing the parts of the valve in open position.
Figure 7:
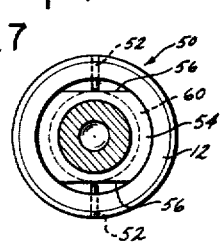
FIG. 7 is a transverse sectional view taken on the line 7—7 of FIG. 5.
Figure 8:
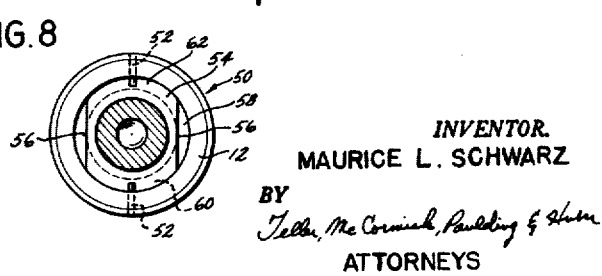
FIG. 8 is a transverse sectional view taken on the line 8—8 of FIG. 6.

When the male member 14 is positioned angularly with respect to the female member as shown in FIG. 7, the pins 52, 52 are aligned with the flats 56, 56 and the male member 14 is therefore free to be moved longitudinally of the female member between its first and second positions. Between the axial portion 54 and the cylindrical part 22 is a radial shoulder 58 which extends entirely around the circumference of the male member 14 and is engageable with the pins 52, 52, as shown in FIG. 5, to limit the rearward movement of the male member relative to the female member. The longitudinal position of the male member relative to the female member as shown in FIG. 5 is referred to as its first position and at this position the ball check 34 is held closed on its seat 32 by the spring 36. In order that the female member may be rotated relative to the male member while the male member is in its first position (that is, without opening the ball check 34) the portion 54 is provided with an annular groove 60 which extends circumferentially between the adjacent ends of the flats 56, 56. The radial shoulder 58 forms the forward wall of this groove. The purpose of the groove is to receive the pins 52, 52 when the male member is in its first position and the pins out of angular alignment with the flats 56, 56. At its rear left-hand end the portion 54 defines a radial shoulder 62 which engages the pins 52, 52 when the male member is moved forwardly to its second position and rotated relative to the female member to bring the pins into the angular relationship with the male member shown in FIG. 8. The pins 52, 52 thus serve to releasably hold the male member in its second position at which position the ball check 34 is held open by the cam portion 42 to permit the forward flow of fluid through the valve assembly 50.

From the foregoing it should be apparent that the bayonet-type locking means provided by the pins 52, 52, the flats 56, 56 and the abutments 58 and 62 operates as follows. Assume first that the parts of the valve assembly 50 are in the relative positions shown in FIGS. 5 and 7. That is, the male member is in its first or rearward position relative to the female member and at such an angular relationship therewith that the pins 52, 52 are aligned with the flats 56, 56. The valve assembly may then be opened for forward fluid flow therethrough by moving the male member longitudinally forwardly to a second position. Then while holding the male member forwardly it may be temporarily locked in said second position by rotating the same approximately 90 degrees in either direction relative to the female member to bring the pins 52, 52 into engagement with the abutment 62. Thereafter the male member may be quickly released from said second position by again rotating it approximately 90 degrees in either direction relative to the female member to realign the pins 52, 52 with the flats 56, 56. Once the pins and flats are so realigned the spring 36 will act to return the male member to its first or rearward position. While in said first position the female member may be rotated independently of the male member for the purpose of making threaded connection with an hydraulic system by reason of the groove 60 which accommodates the pins 52, 52 to permit the male member to assume any angular position relative to the female member.

The invention claimed is:

1. A valve assembly comprising a female body member having a bore extending longitudinally through a part thereof, a male body member having a part slidably received by said bore for movement longitudinally relative to said female member, said male and female members each having a passageway formed therethrough and communicating with said bore to provide a path for the flow of fluid through said valve and one of said members having a valve seat surrounding the inner end of its passageway, a valve element located adjacent said seat, biasing means for urging said valve element into closed position with respect to said seat, and means defining a cam surface on the other of said members for operating said valve element which cam surface is located inside said bore and is of such a size and shape as to permit said valve element to close on said seat when said male member is in a first position relative to said female member and to engage and move said valve member transversely away from said seat to an open position when said male member is shifted longitudinally to a second position relative to said female member whereby said valve may be opened and closed by shifting said male member longitudinally of said female member.

2. A valve assembly as defined in claim 1 further characterized by means for releasably holding said male member in said second position relative to said female member.

3. A valve assembly as defined in claim 1 further characterized by oppositely radially extending parts carried respectively by said two members which parts are arranged to coengage to prevent axial movement of said male member towards said first position when said male member is in said second position and in a given angular relation to said female member and to be out of such coengagement with each other when said male and female members are in a different angular relationship whereby said male member may be moved from said first position to said second position by a plain longitudinal motion and thereafter releasably locked in said second position by being rotated relative to said female member to bring said parts into coengaging relationship.

4. In a valve assembly the combination comprising a female body member having a cylindrical bore extending longitudinally through a part thereof, a male body member having a cylindrical part slidably received by said bore for movement longitudinally relative to said female member between a first position at which said valve assembly is closed and a second position at which said valve assembly is open for the forward flow of fluid therethrough, means for biasing said male member to said first position, an O-ring seal carried by said male member for movement therewith and adapted to engage the surface of said bore to provide a sliding seal between said male and female members, and means defining an annular groove in the surface of said bore which latter groove is so located as to be longitudinally aligned with said O-ring seal when said male member is in said second position so that said groove receives a part of said seal and cooperates therewith as a detent for resisting movement of said male member from said second position.

5. A valve assembly comprising a female body member having a bore extending longitudinally through a part thereof, a male body member having a part slidably received by said bore for movement longitudinally relative to said female member between a first position and a second position at which second position said male member is located more deeply in said female member than it is at said first position, said male and female members each having a longitudinal passageway formed therethrough and communicating with said bore to provide a path for the flow of fluid through said valve and said female member having a valve seat surrounding the inner end of its passageway, a valve element located in said bore between said seat and the inner end of said male member, means for biasing said valve element into closed position with respect to said seat, and a longitudinally extending cam on the inner end of said male member which cam is arranged to engage the side of said valve element and to displace the same transversely from said seat to an open position when said male element is shifted longitudinally from said first position to said second position.

6. A valve assembly comprising a female body member having a bore extending longitudinally through a part thereof, a male body member having a part slidably received by said bore for movement longitudinally relative to said female member between a first position and a second position at which second position said male member is located more deeply in said female member than it is at said first position, said male and female members each having a longitudinal passageway formed therethrough which passageways communicate with said bore to provide a path for the flow of fluid through said valve and said female member having a valve seat surrounding the inner end of its passageway, a valve element located in said bore between said seat and the inner end of said male member, means for biasing said valve element into closed position with respect to said seat so as to normally prevent the flow of fluid through said valve assembly in a forward direction, a longitudinally extending cam on the inner end of said male member which cam is arranged to engage the side of said valve element and to displace the same transversely from said seat to an open position when said male element is shifted longitudinally from said first position to said second position so as to prevent the flow of fluid through said valve in said forward direction, and check valve means associated with the passageway through said male member for preventing the flow of fluid in a reverse direction through said valve assembly.

7. A valve assembly comprising a female body member having a rear portion provided with a cylindrical bore and a forward portion provided with a longitudinal passageway communicating with said bore and which female member is further provided with a rearwardly facing conical valve seat surrounding said passageway and located between said passageway and said bore, a male body member having a cylindrical forward portion slidably received by said bore for longitudinal and rotative movement of said male member relative to said female member, said male member having a longitudinal passageway extending therethrough and communicating with said bore, a ball check disposed generally within said bore and adjacent said seat, a spring compressed longitudinally between said ball check and said male member for normally holding said ball check in a closed position on said seat and said male member in a rearward position relative to said female member, and a forwardly extending cam on the forward end of said male member which cam is normally out of engagement with said ball check but is engageable therewith to displace the same laterally from said seat when said male member is moved longitudinally forwardly from said rearward position to a forward position relative to said female member.

8. The combination as defined in claim 7 further characterized by means defining a forwardly facing conical valve seat surrounding the passageway through said male member, and a ball check located adjacent said latter seat, said spring being compressed longitudinally between said two ball checks so as to normally hold both in closed positions on their respective seats and said male member in a rearward position relative to said female member.

9. The combination as defined in claim 8 further characterized by said forwardly facing valve seat being located some distance rearwardly from the forward end of said latter passageway and said passageway being of an enlarged diameter forwardly of said latter valve seat and serving to receive and laterally support a part of said spring.

10. A valve assembly comprising a female body member having a bore extending longitudinally through a part thereof, a male body member having a part slidably received by said bore for movement longitudinally relative to said female member, said male and female members each having a longitudinal passageway formed therethrough and communicating with said bore to provide a path for the flow of fluid through said valve and one of said members having a valve seat surrounding the inner end of its passageway, a valve element located adjacent said seat, biasing means for urging said valve element into closed position with respect to said seat, a cam means for operating said valve element which cam means is located on the inner end of the other of said members and is of such a size and shape as to permit said valve element to close on said seat when said male member is in a first position relative to said female member and to move said valve member transversely away from said seat to an open position when said male member is shifted longitudinally to a second position relative to said female member whereby said valve may be opened and closed by shifting said male member longitudinally of said female member, an O-ring seal carried by said male member for movement therewith and adapted to engage the surface of said bore to provide a sliding seal between said male and female members, and means defining an annular groove in the surface of said bore which latter groove is so located as to be longitudinally aligned with said O-ring seal when said male member is in said second position relative to said female member so that said groove receives a part of said seal and acts as a detent to resist movement of said male member from said second position.

11. In a valve assembly the combination comprising a female body member having a cylindrical bore extending longitudinally through a part thereof, a male body member having a cylindrical part slidably received by said bore for movement longitudinally relative to said female member between a first position at which said valve assembly is closed and a second position at which said valve assembly is open for the forward flow of fluid therethrough, means for biasing said male member to said first position, and cooperating means on said male and female members providing a bayonet-type lock whereby said male member may be moved longitudinally from said first position to said second position and thereafter locked in said second position by rotating said male member relative to said female member, said cooperating means providing a bayonet-type lock including at least one pin fixed to said female member and extending radially inwardly beyond the surface of said bore, and means defining an annular groove in the surface of said male member for receiving said pin, said groove being longitudinally aligned with said pin when said male member is in said first position and being of sufficient circumferential extent as to allow said female member to be rotated a full 360 degrees relative to said male member when said male member is in said first position.

12. A valve assembly comprising a female body member having means at one of its ends for connection with an hydraulic system and having a longitudinally extending cylindrical bore in its other end, a male body member having a cylindrical part at one end slidably received by said bore for longitudinal and rotative movement of said male member relative to said female member and having means at its other end for connection to a pressure fluid supply line, said male body member and female body member forming a valve chamber therebetween and said male member having a passageway extending therethrough and communicating with said valve chamber and said female member also having a passageway extending through its said one end and communicating with said valve chamber to provide a path for the flow of said pressure fluid through said valve assembly, said male member having a valve seat formed therein surrounding the passageway through said male member and said female member having a valve seat formed therein surrounding the passageway through said female member and which two valve seats face each other, first and second check valve elements located in said valve chamber and cooperating respectively with said two seats to prevent the flow of fluid in either direction out of said valve chamber when said male member is in a first longitudinal position relative to said female member, and means for opening said first check valve element as said male member is moved longitudinally from said first position to a second position relative to said female member.

13. A valve assembly comprising a female body member having means at one of its ends for connection with an hydraulic system and having a longitudinally extending cylindrical bore in its other end, a male body member having a cylindrical part at one end slidably received by said bore for longitudinal and rotative movement of said male member relative to said female member and having means at its other end for connection to a pressure fluid supply line, said male body member and said female body member forming a valve chamber therebetween and said male member having a passageway extending therethrough and communicating with said valve chamber and said female member also having a passageway extending through its said one end and communicating with said valve chamber to provide a path for the flow of said pressure fluid through said valve assembly, said male member having a valve seat formed therein surrounding the passageway through said male member and said female member having a valve seat formed therein surrounding the passageway through said female member and which two valve seats face each other, first and second check valve elements located in said valve chamber and cooperating respectively with said two seats to prevent the flow of fluid in either direction out of said valve chamber when said male member is in a first longitudinal position relative to said female member, means for opening said first check valve element as said male member is moved longitudinally from said first position to a second position relative to said female member, and means for biasing said male member toward said first position and for resisting its movement longitudinally to said second position with the result that said first check valve means is normally maintained in a closed condition to prevent the flow of said pressure fluid through said valve assembly.

14. The combination as defined in claim 13 further characterized by means for releasably holding said male member in said second position after it is moved from said first position to said second position.

15. A valve assembly comprising a female body member having means at one of its ends for connection with an hydraulic system and having a longitudinally extending cylindrical bore in its other end, a male body member having a cylindrical part at one end slidably received by said bore for longitudinal and rotative movement of said male member relative to said female member and having means at its other end for connection to a pressure fluid supply line, said male body member and said female body member forming a valve chamber therebetween and said male member having a passageway extending therethrough and communicating with said valve chamber and said female member also having a passageway extending through its said one end and communicating with said valve chamber to provide a path for the flow of said pressure fluid through said valve assembly, said male member having a valve seat formed therein surrounding the passageway through said male member and said female member having a valve seat formed therein surrounding the passageway through said female member and which two valve seats face each other, first and second check valve elements located in said valve chamber and cooperating respectively with said two seats to prevent the flow of fluid in either direction out of said valve chamber when said male member is in a first longitudinal position relative to said female member, means for opening said first check valve element as said male member is moved longitudinally from said first position to a second position relative to said female member, means for biasing said male member toward said first position and for resisting its movement longitudinally to said second position with the result that said first check valve means is normally maintained in a closed condition to prevent the flow of said pressure fluid through said valve assembly, an O-ring seal carried by said cylindrical part of said male member which seal engages the surface of said cylindrical bore to provide a sliding and rotative seal between said male and female members, and means providing an annular groove in the surface of said cylindrical bore which groove is so located as to receive a part of said O-ring seal when said male member is in said second position with the result that said male member is releasably held in said second position against the action of said biasing means.

References Cited in the file of this patent
UNITED STATES PATENTS

| | | |
|---|---|---|
| 2,619,367 | Hanson | Nov. 25, 1952 |
| 2,761,469 | Hansen | Sept. 4, 1956 |
| 2,890,718 | Smith | June 16, 1959 |

UNITED STATES PATENT OFFICE
CERTIFICATE OF CORRECTION

Patent No. 3,107,691            October 22, 1963

Maurice L. Schwarz

It is hereby certified that error appears in the above numbered patent requiring correction and that the said Letters Patent should read as corrected below.

Column 3, line 20, after "that" insert the following:

> a valve chamber 17 is formed between the female member and the male member, such valve chamber being defined by the inner or right hand end of the female member, the surface of the bore 18, the inner or right hand end of the male member and the enlarged diameter counterbore 19 in the inner or right hand end of the male member. The two seats 32 and 40 are located respectively at the opposite ends of this chamber and face each other. The two associated ball checks 34 and 38 which cooperate with these seats therefore operate to prevent flow of fluid in either direction out of the chamber. The Signed and sealed this 12th day of May 1964.

(SEAL)
Attest:

ERNEST W. SWIDER            EDWARD J. BRENNER
Attesting Officer            Commissioner of Patents